Aug. 15, 1939.    P. DANIELSSON    2,169,791
METHOD OF AND MACHINE FOR EVISCERATING FISH
Filed Nov. 18, 1936    3 Sheets-Sheet 3
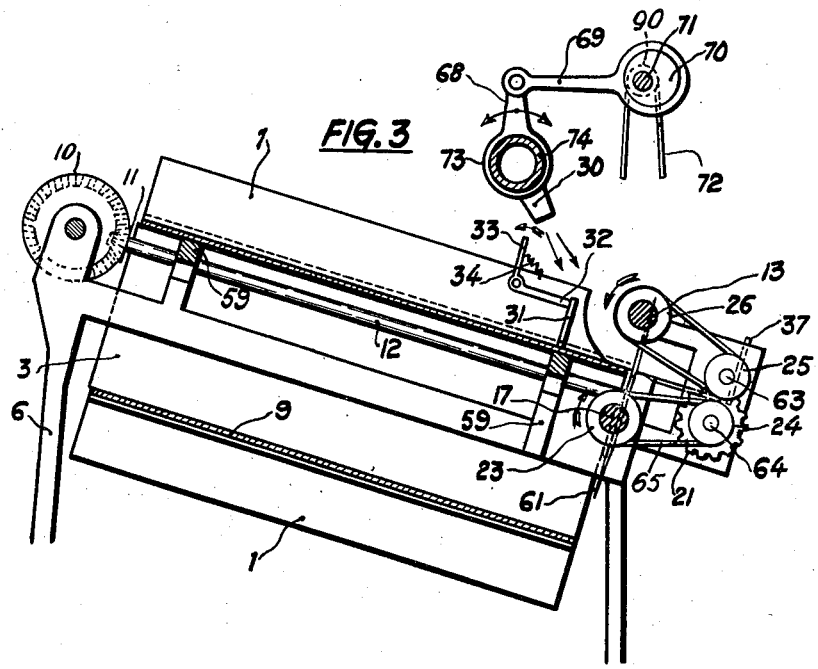
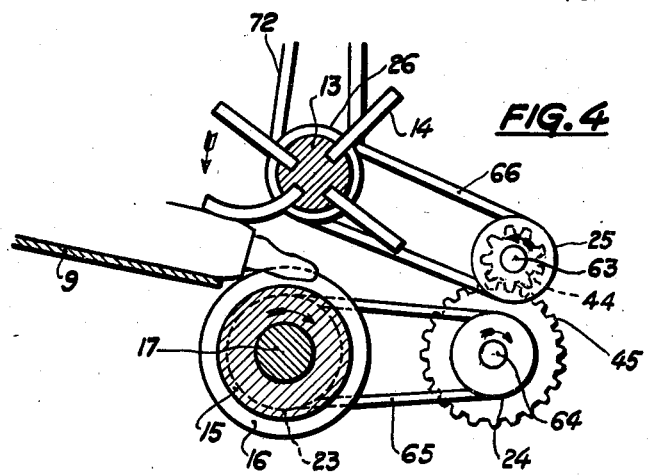
Inventor
Paul Danielsson
By Sommers & Young
Attys.

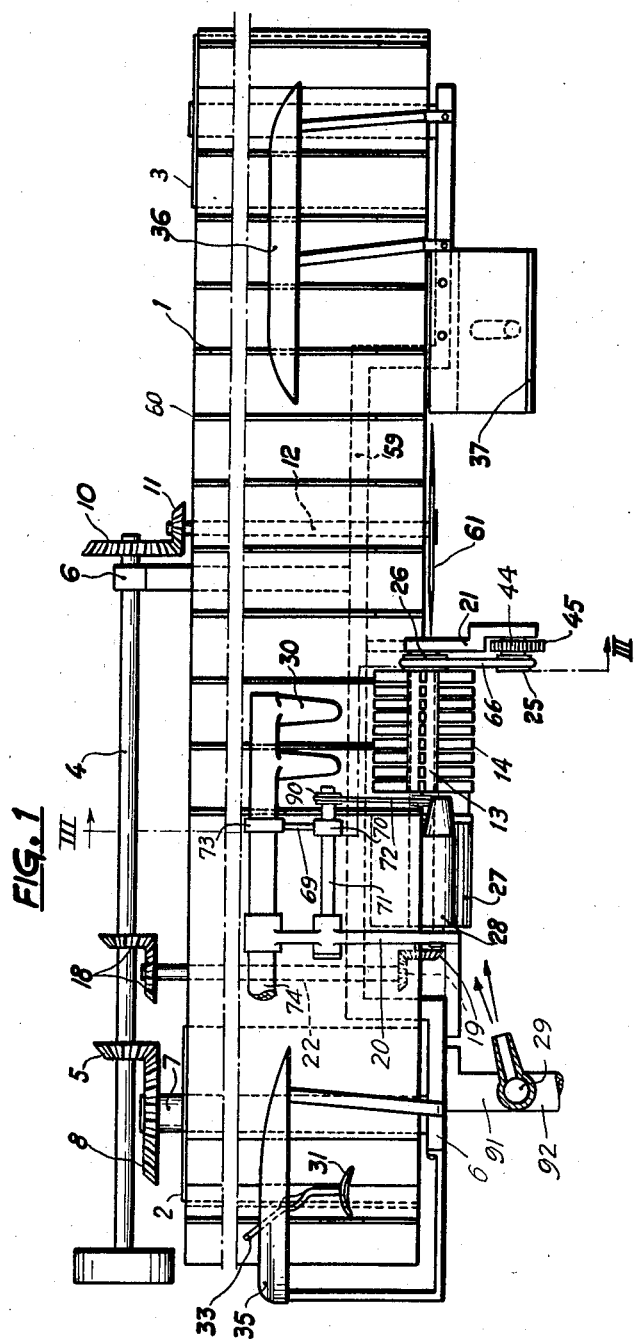

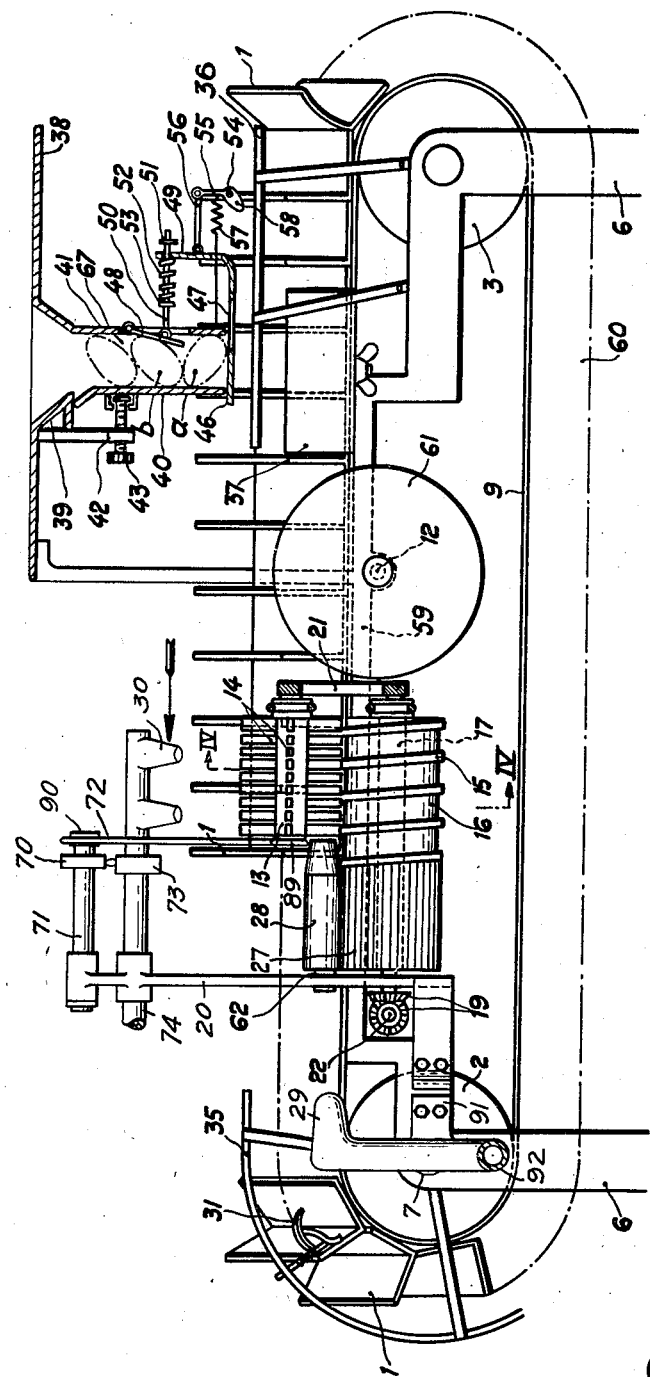

Patented Aug. 15, 1939

2,169,791

UNITED STATES PATENT OFFICE 2,169,791

METHOD OF AND MACHINE FOR EVISCERATING FISH

Paul Danielsson, Pitea, Sweden, assignor to Aktiebolaget Gerh. Archns Mekaniska Verkstad, Stockholm, Sweden, a joint-stock company Application November 18, 1936, Serial No. 111,548
In Sweden November 7, 1934

18 Claims. (Cl. 17—3)

This invention relates to eviscerating of fishes, and more particularly to the removal of the entrails through a cut end of the fish.

It is an object of my invention to gently but nevertheless effectively remove the entrails from the body of the fish, irrespective of the size of the fish.

Another object of my invention is to provide a simple and safely operating machine for eviscerating fishes in a continuous operation, so as to increase the working capacity, and obviate undesired vibrations, and to minimize the power required for driving the machine.

With these and other objects in view, as will appear hereinafter, my invention consists of certain novel features of construction, combination and arrangement of parts, as will be hereinafter described and particularly set forth in the claims hereunto appended.

Referring to the drawings disclosing one embodiment of my invention:

Fig. 1 is an inclined view of the fish eviscerating machine viewed from a direction perpendicular to the plane of the conveyor of Fig. 3, and with the feeding mechanism omitted;

Fig. 2 is an elevational side view of the machine, showing the feed mechanism in section;

Fig. 3 shows a section taken on the line III—III of Fig. 1; and

Fig. 4 shows a section on an enlarged scale taken on the line IV—IV of Fig. 2.

Like characters of reference refer to similar parts and portions throughout the several views of the drawings.

The machine comprises an endless conveyor 60, having a series of pocket-shaped fish-carriers formed by L-shaped plates 1 mounted on a belt 9 which travels over two horizontally inclined rollers 2 and 3 journalled in the machine frame 6. The upper run of the belt 9 is supported by longitudinal bars 59. In the interest of clarity, only a few of the plates 1 are shown in the drawings. For continuously driving the conveyor 60 a bevelled gear wheel 5 is secured to a main driving shaft 4 and meshes with another bevelled gear wheel 8 which is secured to a shaft 7. The shaft 7 is rotatably journalled in the machine frame 6 and carries the roller 2 secured thereto. The roller 3 is loosely journalled in the frame 6. The shaft 4 is rotated to drive the conveyor 60 in the direction of the arrow, as indicated in Fig. 2. A cutter disc 61 is positioned in close proximity of one side of the conveyor 60 and secured to a shaft 12 which is driven by the shaft 4 by the intermediary of the bevel gears 10, 11. Above the conveyor 60 and in sequence to the cutter 61 is arranged means for acting upon the body of the decapitated fish. Said means comprises a shaft 13 which extends longitudinally of the conveyor 60 and is rotatably journalled in a bracket 21, secured to the frame 6. The shaft 13 is provided with four radially or obliquely outwards projecting rows of teeth 14 of rubber or another flexible material. Another shaft 17 is rotatably journalled below the shaft 13 in the bracket 21 and in another bracket 20 secured to the frame 6. A roller 15 secured to the shaft 17 extends longitudinally of the conveyor 60 and has peripheral spiral grooves 16. A longitudinally fluted or ribbed rubber roller 27 is secured on the shaft 17 at the forward end of roller 15. Immediately above the roller 27 is arranged still another roller 28, tapered at the end towards the shaft 13 and loosely journalled on a shaft 62 secured in the bracket 20. For rotating the shaft 17 in the direction of the arrow, as shown in Figs. 3 and 4, bevel gears 19 connect the shaft 17 with a shaft 22, rotatably journalled in the frame 6 and driven by the shaft 4 by means of bevel gearing 18. In the bracket 21 are secured two parallel stub shafts 63 and 64. Grooved rope pulleys 24 and 25 are rotatably journalled on the shafts 64 and 63, respectively. Other grooved pulleys 23 and 26 are secured to the shafts 17 and 13, respectively. The pulleys 25 and 24 are rigidly connected with intermeshing gear wheels 44 and 45, respectively. A driving rope 65 runs over the pulleys 23 and 24 and another driving rope 66 runs over the pulleys 25 and 26. By this arrangement the shaft 4 will drive the shaft 17 to rotate the rollers 15 and 27 in a clockwise direction and the shaft 13 with the teeth 14 in an anticlockwise direction, when viewed in Figs. 3 and 4, and the roller 28 driven by frictional action by the roller 27 will rotate in the same direction as the shaft 13.

A nozzle 29 is connected to a water supply pipe 92 and secured by means of a bracket 91 to the frame 6 and is arranged to spray water onto the rollers 27 and 28 to clean them. Above the conveyor 60 in front of the teeth 14 of the fish working means is arranged a pair of nozzles 30 directed obliquely downwards towards the conveyor 60 and adapted to project a continuous or pulsatory jet of water on to the fishes in the conveyor pockets. Pulsatory spraying of the water can be obtained by periodically opening a cock 73 in the water supply pipe 74 connected to the nozzles 30. To this end, an arm 68 connected to the cock 73 is pivoted to a rod 69 which is reciprocated by an eccentric 70 secured to a revolving shaft 71, driven by pulleys 89 and 90 and a rope 72 from the shaft 13. The shaft 71 is rotatably journalled in the bracket 20 and the water supply pipe 74 is rigidly secured to the same bracket.

For retaining the fishes positioned in the conveyor pockets each pocket has a clamping shoe 31 which is secured to an arm 32 of a bell crank pivoted in the plate 1. The upwardly extending arm 33 of the bell crank is actuated by a tension spring 34 secured to the plate 1 to force the shoe 31 downwards to engage the fish. To release the clamping pressure upon the fish when the conveyor pocket containing said fish has moved past the rollers 27 and 28 a guide plate 35 is arranged above the left end portion of conveyor 60 and adapted to swing the arm 33 in the direction indicated by the arrow in Fig. 3.

For supplying the conveyor pockets with fishes a magazine is arranged above the conveyor. The magazine comprises a hopper 39 extending downwardly from a table 38. The hopper has a downwardly directed channel 67, provided with a fixed wall 41 and a transversely adjustable wall 40. The width of the channel can be accommodated by the adjustment of the wall 40. To this end, the wall 40 is connected to an adjustable screw 43 which is screwed into an arm 42, which extends downwardly from the table 38. At the bottom end of the channel 67 is arranged a shutter 46, which has an opening 47. A plate 48 is hinged to the wall 41 and pivotally connected to a rod 50, which by means of a spring 52 urges the plate 48 into the channel 67. The spring 52 bears against an adjustable flange 53 on the rod 50 and against an upwardly flanged part 49 of the shutter 46. The rod 50 is longitudinally movable through an opening in the flange 49 and has an adjustable shoulder 51. A link 56 is pivoted to the flange 49 and to a lever arm 55 which is pivoted at 54 and has a finger 58 which under the influence of a tension spring 57, connected to the lever arm 55, normally projects downwardly into the path of the conveyor plates 1. For holding the clamping shoes 31 of the conveyor pockets in a raised position in the sphere of the fish feeding magazine now described a guide plate 36 is arranged above the conveyor to actuate the arms 33 in the same manner as the guide plate 35. A gage plate 37 is mounted at the side of the conveyor to support the heads of the fishes and said plate is adjustable to accommodate to fishes of various size.

In operation, a conveyor plate 1 advancing in the direction of the arrow, as shown in Fig. 2, hits the finger 58 and pushes the shutter 46 to the right. When the finger 58 is released the spring 57 urges the shutter 46 to the left, so that the opening 47 registers with the bottom opening of the channel 67, whereby a fish *a* drops into a conveyor pocket at this moment moving below said opening. At this time the fish *b* is retained by the yielding plate 48. When the finger 58 is again hit by a plate 1 the shutter 46 is moved to the right and the flange 49 hits the shoulder 51 of the rod 50, so that the plate 48 is swung to the right and the fishes in the channel 67 move downwards until the fish *b* rests on the shutter 46. The fishes are piled up in the channel 67 with their heads in such direction that a fish dropping into an inclined conveyor pocket will slide head forwards until its head engages the gage plate 37. Due to the peculiar action of the eviscerating means proper, as hereinafter described, the fishes need not be introduced into the conveyor pockets with any certain side turned upwards, wherefor the fishes may be introduced substantially at haphazard, as now described.

The fish in a conveyor pocket is fed laterally to the revolving cutter 61 which completely cuts off the projecting head of the fish in transit. On further advancing the fish is introduced into the sphere of the teeth 14 which gently beat on the cut end of the fish to disengage the entrails from the body of the fish and on such working upon the body of the fish the entrails are partly worked out of the cut end of the fish. In the arrangement shown in the drawings the teeth are moved in a circular path first to engage the body of the fish obliquely and then to yieldingly move longitudinally of the fish towards the cut end of the fish. This working action on the body of the fish can be increased by the action of continuous or pulsatory jets of water projected on to the fish by the nozzles 30. However the nozzles 30 might be omitted, but in certain cases the working action exerted upon the body of the fish by the jets of water will be sufficient to work out part of the entrails without the assistance of the teeth 14, which might then be omitted. The jets of water exert also a pulling action on the entrails worked out. It is of importance that the body of the fish is exteriorly subjected to working in the sense now mentioned, i. e. by kneading or more or less vibratory mechanical or hydraulic action. Working of the body of the fish is, therefor, not to be confused with ordinary pressing action, as exerted by the shoes 31, for example.

On being worked out of the cut end of the body of the fish the end of the entrails is introduced into the groove 16 of the revolving roller 15 and moved by said roller laterally towards the rollers 27 and 28. The pitch of the spiral groove of the roller 15 is such that the rate of lateral displacement of the worked out part of the entrails is the same as the rate of movement of the conveyor 60. On moving the worked out part of the entrails laterally the roller 15 exerts a slight pull on said part and thereby it assists in pulling the entrails out of the end of the body of the fish.

After the fish has been transferred from the sphere of the teeth 14 and nozzles 30 the worked out part of the entrails is introduced between the rollers 27 and 28 which seize said part of the entrails and pull the entrails completely out of the body of the fish while the fish is continuously fed laterally. Obviously, such continuous and comparatively slow withdrawal of the entrails will be effected gently, so that, if desired, valuable roe or other matter may remain in the body of the fish. In the meantime, the jet of water projected by the nozzle 29 will clean the rollers 27 and 28 as well as the eviscerated body of the fish. When moving the pocket carrying the fish farther the arm 33 hits the guide plate 35 by which it is moved aside, so that the shoe 31 releases the eviscerated body of the fish, which will then drop out of the conveyor at the left end of the machine shown in Figs. 1 and 2.

I claim:

1. A method of eviscerating fishes, comprising decapitating the fish, vibratorily working the cut head end portion of the fish exteriorly to work part of the entrails out of the cut head end, and pulling the entrails by their outwardly projecting part out of the body of the fish.

2. A method of eviscerating fishes, comprising decapitating the fish, kneading the cut head end portion of the fish exteriorly in a direction towards its cut head end to work part of the entrails out of said head end, and pulling the entrails by their outwardly projecting part out of the body of the fish.

3. A method of eviscerating fishes, comprising decapitating the fish, projecting a jet of water onto the cut head end portion of the fish in a direction obliquely from the tail end towards the cut head end, to work the body of the fish exteriorly and work part of its entrails out of said head end, and pulling the entrails by their outwardly projecting part out of the body of the fish.

4. In a fish-eviscerating machine, a carrier, means for vibratorily working the cut head end portion of a fish in said carrier exteriorly to work part of the entrails out of the cut head end, and means for pulling the entrails by said part out of the body of the fish.

5. In a fish-eviscerating machine, a carrier, a nozzle directed against said carrier for projecting a jet of water on to the cut head end portion of a fish in said carrier to work part of the entrails out of the cut head end, and means located at a side of said carrier for pulling the entrails by said part out of the body of the fish, said nozzle being directed against said side of said carrier.

6. In a fish-eviscerating machine, a carrier, a pressing member, means for moving said pressing member, first to engage the body of a fish in said carrier and then to move longitudinally of said fish to work part of the entrails out of a cut end, and means for pulling the entrails by said part out of the body of the fish.

7. In a fish-eviscerating machine, a carrier, a pusher, means for moving said pusher repeatedly to beat on the body of a fish in said carrier to work part of the entrails out of the cut head end, and means for pulling the entrails by said part out of the body of the fish.

8. In a fish-eviscerating machine, a carrier, a rotatable holder, a pressing member projecting from said holder laterally from the axis of rotation of said holder, means for rotating said holder to move said pressing member into engagement with the body of a fish in said carrier and to move said member longitudinally of said fish to work part of the entrails out of a cut end of said fish, and means for pulling the entrails by said part out of the body of the fish.

9. In a fish-eviscerating machine, a carrier, a yielding pressing member, means for moving said pressing member to yieldingly engage the body of a fish in said carrier and move longitudinally of said fish to work part of the entrails out of a cut end of said fish, and means for pulling the entrails by said part out of the body of the fish.

10. In a fish-eviscerating machine, a carrier, means for working on a fish in said carrier, said means having a row of flexible teeth, means for moving said teeth, first to engage the body of the fish and then to move longitudinally of said fish to work part of the entrails out of a cut end of said fish, and means for pulling the entrails by said part out of the body of the fish.

11. In a fish-eviscerating machine, a carrier, a pressing member, means for moving said pressing member, first to engage the body of a fish in said carrier and then to move longitudinally to work part of the entrails out of a cut end of said fish, a nozzle directed against said carrier to project a jet of water obliquely on to the body of the fish to assist in working part of the entrails out of the cut end of the fish, and means for pulling the entrails by said part out of the body of the fish.

12. In a fish-eviscerating machine, a carrier, a pressing member, means for moving said pressing member, first to engage the body of a fish in said carrier and then to move longitudinally to work part of the entrails out of a cut end of said fish, and a nozzle directed against said carrier to project a jet of water obliquely on to the body of the fish to exert a pulling action on said part of the entrails to withdraw the entrails from the body of the fish.

13. In a fish-eviscerating machine, a series of fish-carriers, means for moving said carriers in an endless path, a cutter arranged at a side of said path to decapitate the fish in said carriers, means for vibratorily working the cut head end portion of the fish exteriorly in a direction towards said side of said path to work part of the entrails out of the cut head end of said fish, and means for pulling the entrails by said part out of the body of the fish.

14. In a fish-eviscerating machine, a series of fish-carriers, means for moving said carriers in an endless path, a cutter arranged at a side of said path to decapitate the fish in said carriers, means for working the body of the cut fish exteriorly to work part of the entrails out of the cut end of said fish, and means for pulling the entrails by said part out of the body of the fish, said working means having a row of teeth which extends longitudinally of said path and is movable in a circular path to repeatedly act upon the body of the fish moved laterally in transit.

15. In a fish-eviscerating machine, a series of fish-carriers, means for moving said carriers in an endless path, a cutter arranged at a side of said path to decapitate the fish in said carriers, means for vibratorily working the cut head end portion of the fish exteriorly in a direction towards said side of said path to work part of the entrails out of the cut head end of said fish, means for pulling the entrails by said part out of the body of the fish, said pulling means comprising a pair of rotatable rollers arranged closely above one another alongside said path, and means for rotating said rollers in opposite directions to exert the pulling action on said part of the entrails.

16. In a fish-eviscerating machine, a series of fish-carriers, means for moving said carriers in an endless path, a cutter arranged at a side of said path to decapitate the fish in said carriers, means for working the body of the cut fish exteriorly to work part of the entrails out of the cut end of said fish, means for pulling the entrails by said part out of the body of the fish, and a rotatable roller extending alongside said part and having in its periphery spiral conveyor grooves adapted to receive and support the pulled out part of the entrails and convey it laterally to introduce it into said pulling means.

17. In a fish-eviscerating machine, a series of fish-carriers, means for moving said carriers in an endless path, a cutter arranged at a side of said path to decapitate the fish in said carriers, means for working the body of the cut fish exteriorly to work part of the entrails out of the cut end of said fish, means for pulling the entrails by said part out of the body of the fish, and a rotatable roller extending alongside said part and having in its periphery spiral conveyor grooves adapted to receive and support the pulled out part of the entrails and convey it laterally to introduce it into said pulling means, the rotary direction of said grooved roller being such that it exerts a pull on said part of the entrails.

18. In a fish-eviscerating machine, the combination with a series of fish-holders and means for moving said holders in an endless path, of a cutter arranged at a side of said path to decapitate the fish in said holders, a rotatable carrier extending lengthwise of and above said path, a pressing member projecting radially from said carrier, means to rotate said carrier to successively move said pressing member to press against the fish body in the holders and move longitudinally of the fish to work part of the entrails out of the cut end of the fish, a pair of rotatable rollers arranged alongside said endless path closely above one another, and means to rotate said rollers in opposite directions to seize said part of the entrails and pull the entrails out of the body of the fish.

PAUL DANIELSSON.

CERTIFICATE OF CORRECTION.

Patent No. 2,169,791.  August 15, 1939.

PAUL DANIELSSON.

It is hereby certified that error appears in the printed specification of the above numbered patent requiring correction as follows: Page 3, first column, line 38, claim 7, for the word "body" read cut head end portion; same column, line 71, and second column, line 6, claims 11 and 12 respectively, after "longitudinally" insert of the fish; and that the said Letters Patent should be read with this correction therein that the same may conform to the record of the case in the Patent Office.

Signed and sealed this 14th day of November, A. D. 1939.

(Seal) Henry Van Arsdale,
Acting Commissioner of Patents.